Patented Dec. 27, 1938

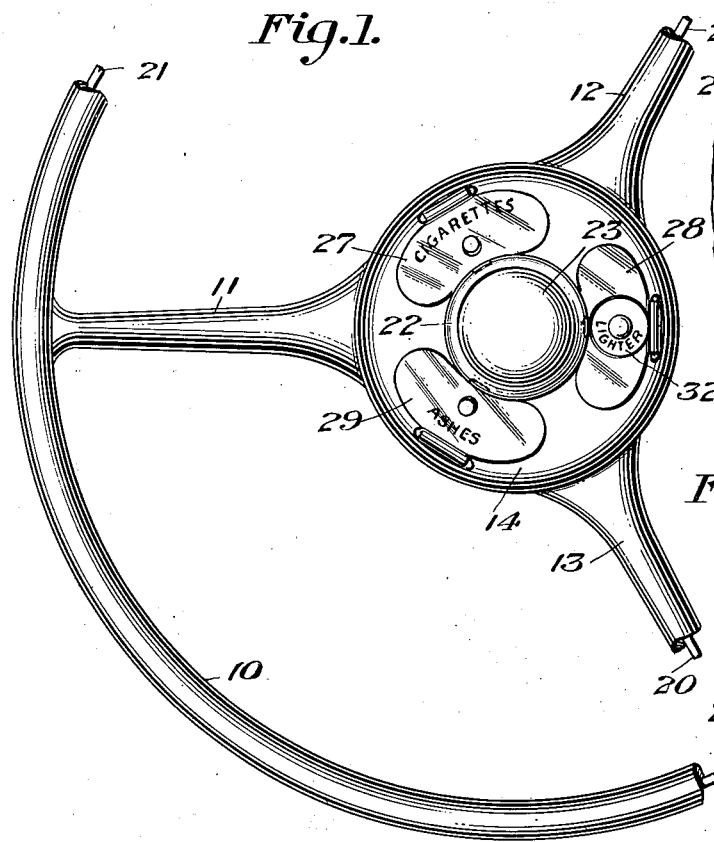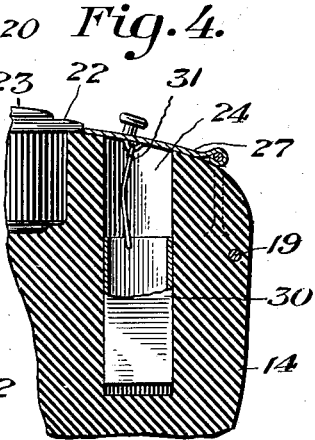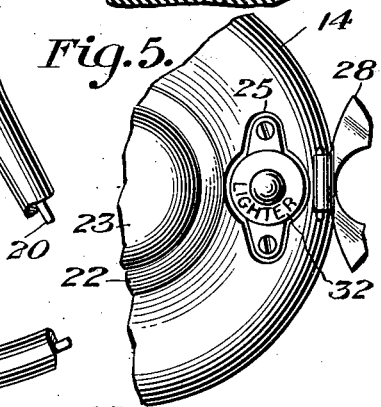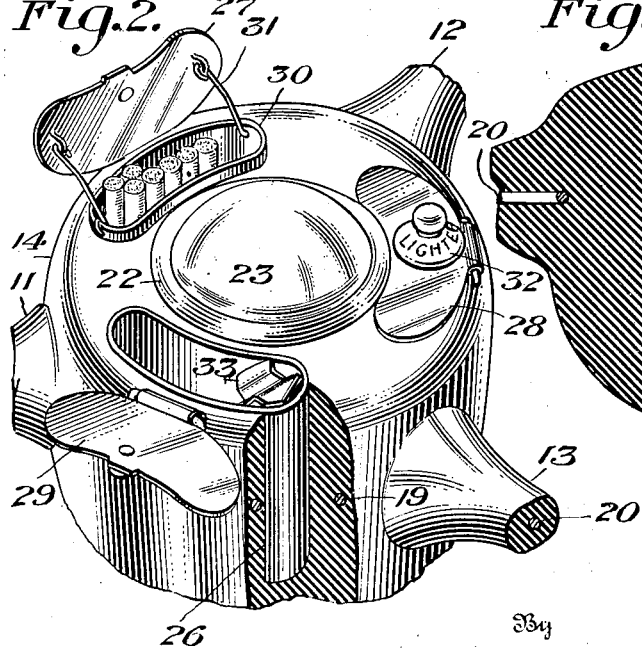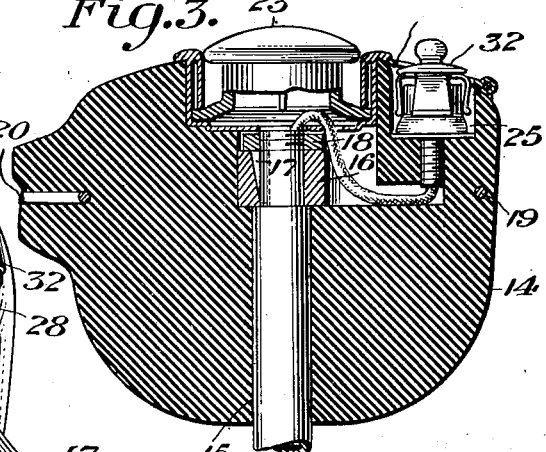

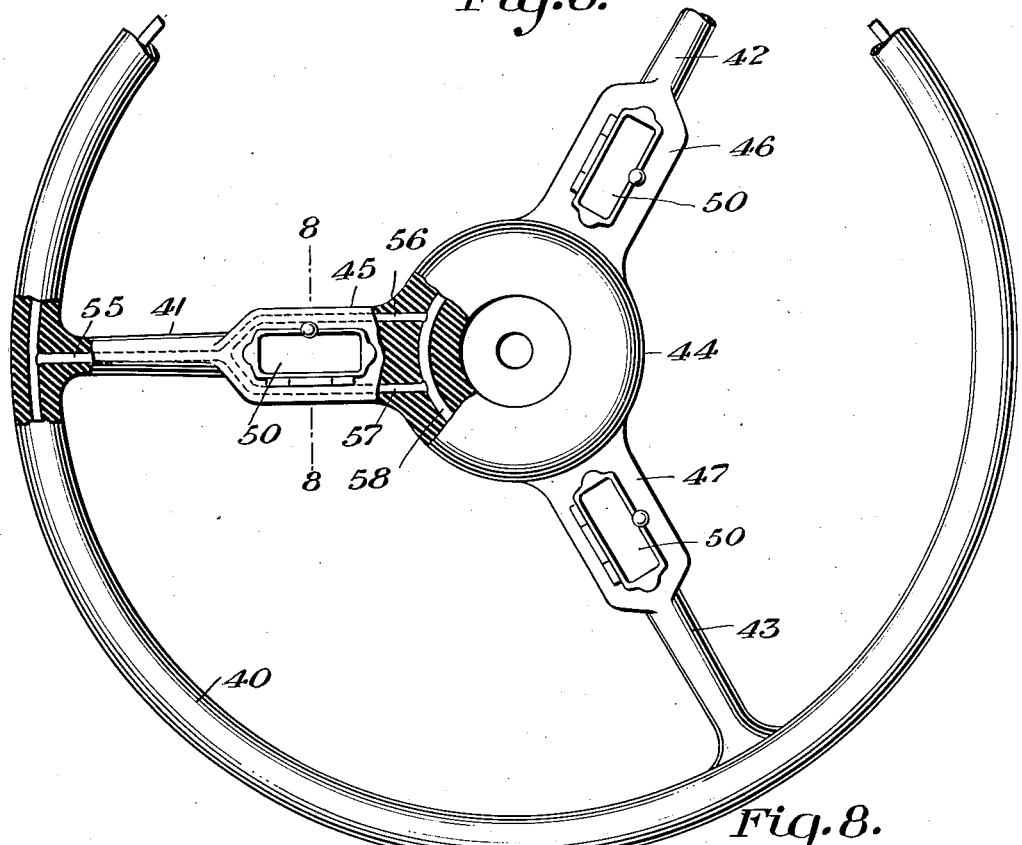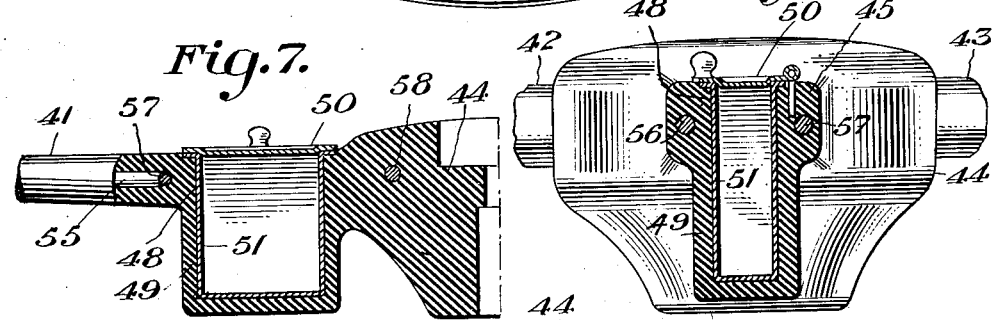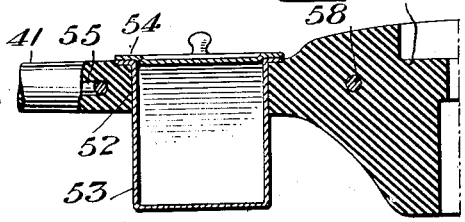

2,141,832

UNITED STATES PATENT OFFICE 2,141,832

STEERING WHEEL CONSTRUCTION

Edward G. Von Gunten, Akron, Ohio

Application March 2, 1935, Serial No. 9,085

4 Claims. (Cl. 206—19.5)

This invention relates to molded automobile steering wheels of rubber or similar plastic composition and involves a modified formation adapting the same to provide one or more integral pockets suitable to hold articles within convenient reach of the automobile driver.

Steering wheels are conventionally molded with a rim, connecting spokes and hub, and such parts usually are reinforced with a metallic core to give them the necessary strength. The hub is molded to fit the steering column and receive a horn button at its top, but is of relatively small diameter and, together with the spokes, incorporates the minimum of material consistent with strength and is generally unsuited to the purposes of the present invention.

According to the invention receptacles usable as cigarette containers, ash trays, for electric lighters or other miscellaneous purposes are provided integral with the steering wheel. To this end the steering wheel must be molded in a different form from that conventionally employed, and construction is such that the desired receptacles are provided as pockets integral with the steering wheel body.

The nature and manner of practicing the invention will be understood from the following description in conjunction with the accompanying drawings, wherein:

Fig. 1 is a plan view of one form of steering wheel embodying the invention;

Fig. 2 is an enlarged perspective of the central part of the wheel of Fig. 1;

Fig. 3 is a view in vertical section of the hub as shown in Figs. 1 and 2;

Fig. 4 is a vertical section of a fragmentary part of the hub through one of the receptacles taken at an angle to Fig. 3;

Fig. 5 is a fragmentary plan view to illustrate the details of certain parts shown in Figs. 1, 2, and 3;

Fig. 6 is a plan view of another form of the invention broken away in several areas to illustrate the manner of reinforcement;

Fig. 7 is a longitudinal elevation, mostly in section taken at right angles to Fig. 8;

Fig. 8 is a view partly in section and partly in elevation taken on line 8—8 of Fig. 1; and, Fig. 9 is a view corresponding to Fig. 7 but showing a modified construction.

In the embodiment of Figures 1 through 5 the steering wheel includes a rim 10, a plurality of connecting spokes 11, 12 and 13 and a central or hub portion generally designated by the reference numeral 14. All of such parts will be molded as an integral unit according to well known practice and may be composed of hard rubber or other suitable plastic materials. The hub 14 will be molded to provide an axial recess at its underside to receive the steering column 15. Any of the usual expedients may be employed to fix the hub to the steering post 15. As shown in Figure 3, such purpose is accomplished by molding a bushing or sleeve 16 in the hub which may be locked to the upper end of the post 15 through a key 17. The upper end of post 15 may be threaded and a securing nut 18 applied thereto to seat against the bushing 16.

It is normally desirable to reinforce the various parts of the steering wheel. Accordingly, the hub is reinforced with a rigid wire ring 19. Similarly the spokes are provided with metallic cores 20 and the rim with a core 21.

The top central area 22 of the hub 14 may be recessed and a horn button 23 housed therein in accordance with the usual practice.

The construction as so far described is intended merely to indicate the usual form of molded steering wheel in connection with which the invention is employed.

In the course of manufacture the steering wheel according to the invention is molded to provide one or more pockets for the reception of articles. Such arrangement may be carried out by enlarging the area of certain parts of the wheel. In any case the pockets will be formed in the wheel body, and from the practical standpoint it is desirable to incorporate the pockets in the hub area or in the spokes adjacent the hub. By such arrangement the outer ends of the spokes and rim which are grasped by the hands will not be encumbered. That is to say, the pockets will be provided somewhere in the central area of the wheel. Since the wheels now commonly employed are of relatively small dimensions it is normally necessary for carrying out the present invention to increase the size of the wheel in the desired areas in order to accommodate the pockets. Departure from the usual form of wheel will be governed by the number, size and shape of pockets desired. Without unduly increasing the size of the central area of the wheel I have found it entirely practicable to incorporate three pockets of useful size.

In the embodiment of Figure 1 the pockets are formed in the hub proper. To accommodate the pockets the diameter of the hub 14 will normally be greater than that of conventional wheels, and as shown in Figure 3 the depth and shape of the hub will be substantially greater to provide a body of sufficient size to accommodate the pockets. The reinforcing ring 19 will be located well towards the periphery of the hub so as not to interfere with the provision of the pockets.

It will be understood that the article pockets provided in the wheel in accordance with the invention may be variously formed to adapt them to different purposes. In the present embodiment I have shown a construction particularly useful for smokers. The arrangement shown is such as to provide a casing for cigarettes, incorporated by pocket 24, best shown in Figure 4, an electric lighter pocket 25 and an ash compartment pocket 26. Such series of pockets are arranged at different radial points of the hub 14 outwardly of the horn button 23. The pockets may be made of any desired length and width within required limits, being governed only by the diameter and depth of the hub 14.

The pocket 24 is provided with a hinged cover 27 which may be supported on suitable connecting elements molded into the top area of the hub as indicated in Figure 4. With such an arrangement it is possible to use the pocket 24 itself as a compartment to house cigarettes. Preferably, however, the pocket will be provided with a slidable container 30 of lesser depth than the pocket. The container if desired can be connected to the cover 27 by links 31 so that as the cover is raised container 30 will be drawn upwardly to the position shown in Figure 2, thus to enable a cigarette to be conveniently grasped.

The pocket 25, as previously indicated, may be used to support an electric lighter. Such an arrangement is best indicated in Figure 3, from which it will be observed that the pocket 25 may be of considerably less depth than the cigarette compartment 24 as shown in Figure 4. A hinged cover 28 may if desired be provided to give a balanced and neat appearance to the steering wheel, but as will be evident from Figure 5 the same is unnecessary inasmuch as the pocket 25 will ordinarily be especially formed of proper size to house any conventional type of electric lighter indicated generally by numeral 32.

The pocket 26 in the illustrated form of the invention is intended as an ash compartment and preferably will be provided with a hinged cover 29. A removable container may be inserted in the pocket to facilitate the removal of ashes and this may be provided with a cigarette rest in the form of a clip 33 which will firmly hold the cigarette during motion of the automobile.

It will be noted that the pockets 24, 25 and 26 are arranged in the hub in the segmental areas between the points of connection of the hub and the spokes. This is entirely a matter of design inasmuch as the arrangement of the hub reinforcing core 19 outwardly of the series of pockets enables the spoke reinforcing cores 20 to be connected thereto without regard to the radial positions occupied by the various compartments.

Instead of providing the article compartments in the main body of the hub they may be incorporated in a series of individual extensions of the hub, or in enlargements of the inner ends of the various spokes. Reference is made in this connection to the embodiment shown in Figures 6 through 8. The wheel is molded to include a rim 40, a series of spokes 41, 42 and 43, and a hub 44 of conventional size and shape. To accommodate the desired article pockets the wheel is molded in certain areas outwardly of the hub proper to accommodate one or more pockets. Conveniently the compartments may be incorporated by forming the inner parts of the series of spokes with respective enlargements 45, 46 and 47, and as outward extensions of the hub 44. It will be understood, however, that if it is desired to maintain the usual form of spoke the pockets may be housed in a series of individual extensions projecting outwardly beyond the periphery of the hub 44 in the sectors of the wheel between the various spokes.

The arrangement of the various spokes are illustrated in the detailed views of Figures 7 and 8. As previously noted an enlargement 45 is provided at the inner end of spoke 41 adjacent the periphery of hub 44. Such portion of the wheel is molded to provide a recess 48. The enlargement 45 in addition to being wider than spoke 14 may be provided with an integral depending portion 49 extending below the underside of the spoke, thus forming a closed compartment of appreciable depth. Such compartment is provided with a cover 50. While the closed pocket formed may itself be used as a receptacle, a separate container may be removably fitted into the pocket. In such case it is immaterial whether the cover 50 is hingedly secured to the wheel portion 45 or to the container 51.

Where a separate container such as just described is employed, it is not necessary to provide the enlarged portion 45 of the spoke with the depending extension 49. Instead the area 45 may be made of the same thickness as the spoke and provided merely with a recess 52. A container 53 will be fitted in the recess, provided at its upper end with a flange engageable with the upper side of portion 45. As in the construction of Figure 7 a cover may be provided, indicated at 54 which may be hingedly secured either to the container 53, or hinged on pins anchored in the enlargement 45 as indicated in Figure 8.

It will be evident that when the article compartments are provided in enlarged portions of the spokes, as in the embodiment of Figure 6, it is necessary to make some alteration in the reinforcing core of the spokes. Accordingly, as shown in Figures 6 and 8, the reinforcing core 55 extending through the spokes is forked to provide two parallel extensions 56 and 57 molded into the enlarged portion 45 on opposite sides of the pocket 48 and connecting with the reinforcing core 58 of the hub 44.

From the several embodiments of the present invention herein illustrated and described, it will be evident to those skilled in the art that the central area of a steering wheel may in accordance with the invention be variously modified to provide a series of integral article pockets without in any way interfering with the normal use of the steering wheel. Article pockets may thus be provided within ready reach of the driver. The arrangement does not necessitate any auxiliary structure projecting above the plane of the wheel such as might interfere with the arm of the driver. Furthermore, it will be evident that while the invention requires enlargement of certain areas of the steering wheel structure, the construction may be carried out without making such device bulky or of objectionable form and appearance.

I claim:

1. A molded steering wheel body including a hub having a central axial portion adapted to engage a steering column and having an annular area of substantial width and depth beyond the central portion molded to include a series of article compartments.

2. A spoked steering wheel including a large hub portion, a central opening in the top part of the hub portion, a solid annular hub area of substantial width surrounding the central opening, and a series of circumferentially arranged spaced apart compartment recesses formed in said solid hub area about the central opening.

3. A spoked steering wheel including a hub portion of large diameter, an axial bore in the under part of said hub adapted to receive the steering column, a central recess overlying said bore and housing a horn button assembly, a solid annular hub area of substantial width surrounding the horn button assembly, and a circumferentially arranged series of article compartments in said annular hub area about the horn button assembly.

4. A spoked steering wheel including a large hub portion, a central opening in the top part of the hub portion, a solid annular hub area of substantial width throughout its periphery surrounding the central opening, and at least one compartment recess formed in said solid hub area about the central opening.

EDWARD G. VON GUNTEN.